United States Patent [19]

Hsia

[11] Patent Number: 4,817,107
[45] Date of Patent: Mar. 28, 1989

[54] LASER PLASMA CHAMBER

[75] Inventor: James C. Hsia, Andover, Mass.

[73] Assignee: Laser Science, Inc., Cambridge, Mass.

[21] Appl. No.: 803,165

[22] Filed: Dec. 2, 1985

Related U.S. Application Data

[63] Continuation-in-part of Ser. No. 496,068, May 19, 1983, abandoned.

[51] Int. Cl.⁴ .............................................. H01S 3/03
[52] U.S. Cl. ...................................... 372/61; 372/83; 372/86
[58] Field of Search ............... 313/594, 595, 596, 601; 372/61, 83, 86

[56] References Cited

U.S. PATENT DOCUMENTS

| | | | |
|---|---|---|---|
| 3,789,310 | 1/1974 | Mancebo | 313/351 |
| 4,009,408 | 2/1977 | Dat et al. | 313/198 |
| 4,047,064 | 9/1977 | Cosco et al. | 313/594 |
| 4,065,370 | 12/1977 | Noble et al. | 313/198 |
| 4,207,541 | 6/1980 | Karger et al. | 372/35 |
| 4,503,542 | 3/1985 | Cirkel | 372/86 |
| 4,554,667 | 11/1985 | Kaminski | 372/86 |

OTHER PUBLICATIONS

Marchetti et al; "Compact Sealed TEA CO₂ Lasers . . . "; *IEEE J. of Quantum Electr.;* vol. QE-19, No. 10; Oct. 1983; pp. 1488-1492.

Marchetti et al; "A New Type of Corona Discharge Photoionization"; *J. Appl. Phys.;* vol. 56, No. 11; Dec. 1984; pp. 3163-3168.

*Primary Examiner*—William L. Sikes
*Assistant Examiner*—Robert E. Wise

[57] ABSTRACT

The invention is described as embodied in a plasma chamber for use in gas lasers. A sealed nitrogen gas laser is provided with a pair of capacitance coupled, symmetrically positioned pre-ionizer elements in the form of a pair of insulated wire loops extending from one electrode to the region adjacent the other electrode. All parts of the plasma chamber accessible to ultraviolet radiation or ionized gases and are formed entirely of inorganic materials, such as ceramic and quartz, eliminating previously unrecognized difficulties resulting from the use of plastic or other organic materials in the chamber construction, thus making possible a sealed low-power nitrogen laser having a relatively long life. The pre-ionizer elements, which may be used in lasers of other types, both sealed and unsealed, produce a pre-ionization current that is limited to the capacitance displacement current, and are symmetrically positioned with respect to the adjacent negative electrode so that the laser beam is not distorted by the pre-ionization currents.

6 Claims, 1 Drawing Sheet

LASER PLASMA CHAMBER

CROSS-REFERENCE TO RELATED APPLICATION

This application is a continuation-in-part of U.S. patent application Ser. No. 06/496,068 filed May 19, 1983, now abandoned.

BACKGROUND OF THE INVENTION

1. Field of the Invention:

This invention relates to gas laser systems and more particularly to pre-ionization electrodes within the plasma chambers. The invention is embodied in a sealed nitrogen gas laser having a pair of capacitance coupled, symmetrically positioned pre-ionizing elements.

2. Description of the Prior Art:

Many gas lasers require a constant recirculation of gases during operation because of deterioration or changes in the gas during operation. Sealed plasma chambers have also been used, but in general such sealed plasma chambers using either atomic or molecular gases have a shorter life than those with a continual supply of fresh gas.

High power lasers utilize plasma chambers formed of materials such as ceramic and quartz because of the high temperatures associated with such lasers. In lower power laser systems using relatively inert gases, such as nitrogen, it is usual practice to form the plasma chambers from plastic. This choice is made because plastic is more readily shaped and machined and does not break easily. Since the gas is not reactive and high temperatures are not produced during operation, there is no obvious reason for using materials that are more difficult to fabricate, such as ceramic and quartz. However, nitrogen gas lasers heretofore constructed have an acceptable life only if periodically replenished with fresh gas. No satisfactory nitrogen gas laser has been constructed using a sealed plasma chamber.

Gas lasers have been provided with various kinds of pre-ionizer elements in the forms of shields and screens or spark sources. These pre-ionizer elements are not well suited for small low-power gas lasers, resulting in some instances in the requirement for separate high voltage switches, pulse generating means and synchronizing circuits. Excessive ionization currents and perturbation of the laser beam are frequent sources of difficulty.

Many gas lasers previously in use are satisfactory only for laboratory applications because of the requirement for a steady flow of fresh gas or because considerations of cost or complexity make commercial use impracticable.

U.S. Pat. No. 4,380,079 to Cohn et al shows a laser having a pre-ionizing electrode which creates a series of spark discharges along the length of the electrode. A similar pre-ionizing system is described in a thesis entitled "Far Infrared Spectroscopy of Methyl Alcohol using Continuously-Tunable TEA Laser Optical Pumping", submitted to Massachusetts Institute of Technology in June 1979 by Robert G. Gibson in partial fulfillment of the requirements for the Degree of Doctor of Philosophy. The pre-ionizer element is typical of previously used pre-ionizers. Those pre-ionizers are not effective in eliminating streamers and preventing perturbation of the main discharge and thus fail to provide maximum laser performance.

BRIEF SUMMARY OF THE INVENTION

The present invention provides an economical low-power gas laser having a sealed plasma chamber and a life of many millions of pulses. The embodiment described comprises a nitrogen-filled plasma chamber formed entirely of inorganic materials, such as ceramic and quartz, eliminating previously unrecognized difficulties resulting from the use of plastic or other organic materials in areas of the chamber accessible to ultraviolet radiation or ionized gases. Pre-ionization elements with limited discharge currents, are symmetrically arranged so that the laser beam is not distorted by the pre-ionization currents. A pair of insulated loop-shaped pre-ionizer elements extend from one electrode along and near the surface of the opposite electrode. The ionization current is limited by the insulating dielectric surrounding the pre-ionizer elements while the symmetrical position with respect to the adjacent electrode prevents distortion of the laser beam by the pre-ionization currents.

The self-contained laser systems made possible by the use of the chamber described here are suitable for many applications where lasers are currently not used or used only in limited quantities because of considerations of cost, operating life or convenience.

DESCRIPTION OF THE PREFERRED EMBODIMENT

The plasma chamber of this invention is formed by an envelope, generally indicated at 2, having a tubular section 4, formed of ceramic material, and quartz windows 6 and 6a closing opposite ends of the envelope. The quartz windows preferably are coated to minimize reflections at appropriate frequencies as is well known in the art.

Figure 1:
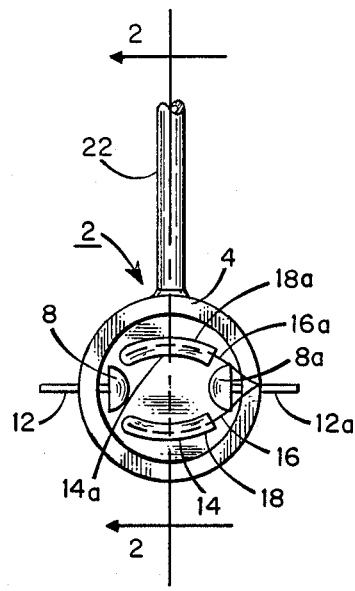
FIG. 1 is an end view of a plasma chamber embodying the invention.
Figure 2:
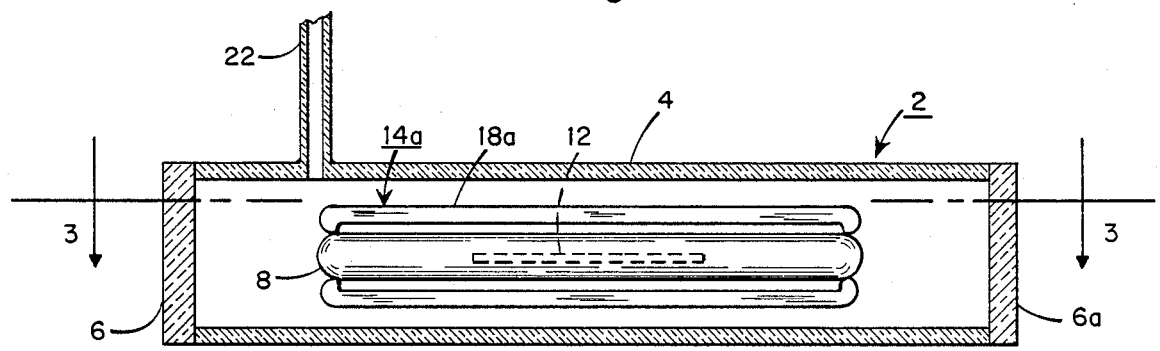
FIG. 2 is a sectional view along line 2—2 of FIG. 1.

A first electrode 8 (the cathode) extends longitudinally within and along one side of the tubular section 4 of the envelope. This electrode is generally cylindrical in cross section, as best shown in FIG. 1, with the rounded surface facing the center line of the plasma chamber. The ends and corners of the electrode are rounded to minimize unwanted nonuniformities in the electric field.

To make electrical connection to the electrode 8, a connector plate 12 is secured to, or formed integrally with, the plane surface of the electrode 8 and extends through the adjacent wall of the envelope 2. In order to minimize inductance, the connector plate 12 should have substantial dimensions and preferably should have a length at least one-third the length of the electrode to which it is connected.

Figure 3:
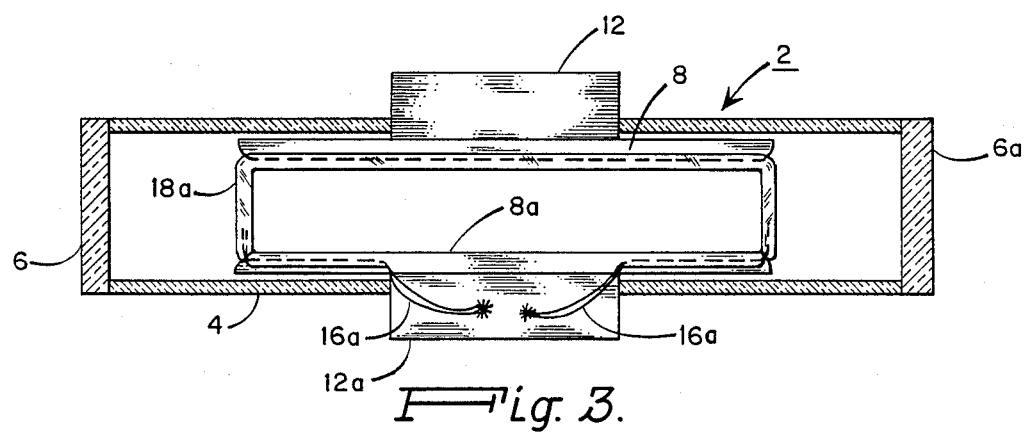
FIG. 3 is a sectional view along line 3—3 of FIG. 2.

A second electrode 8a, (the anode) identical with the electrode 8, is positioned along the opposite wall of the chamber 2, as best shown in FIGS. 1 and 3. A pre-ionizer element, generally indicated at 14, is formed of a generally U-shaped loop 16 of wire, such as nickel or other suitable conductor. Each end of the loop 16 is secured by brazing or other means to the connector plate 12a. The two ends of the loop extend across the chamber into the region adjacent the negative electrode 8 where they are joined by a linear section of the wire loop that extends along and is spaced from the lower surface of the electrode 8 as best shown in FIG. 1. The wire loop 16, except for the portions near the positive electrode 8a, is surrounded by a glass tube 18.

A similar wire loop 16a is also secured to the connector plate 12a and extends along and is spaced from the upper surface of the electrode 8 as viewed in FIG. 1. This loop is also surrounded by a glass tube 18a. As seen in the end view of FIG. 1, the ends of the loops 16 and 16a are curved outwardly about the center line of the plasma chamber to avoid interference with the laser beam.

The chamber 2 is evacuated and filled with nitrogen by means of a fill tube 22 which is then sealed. The functioning of the plasma chamber to produce a laser gain medium is well known in the art. High voltage pulses are applied by conections along the full length of the connector plates 12 and 12a from a conventional high speed pulsed voltage source (not shown). Two mirrors (not shown) to produce the laser oscillations are positioned in conventional manner adjacent opposite ends of the plasma chamber 2.

The pre-ionizer electrodes 14 and 14a generate an initial corona discharge at the inception of each pulse, but the current is limited to the displacement current because of the insulator tubes 18 and 18a surrounding the wire loops 16 and 16a. The use of two symmetrically-positioned pre-ionizer elements prevents distortion of the laser beam that would otherwise be caused by the pre-ionization currents.

It is important that no plastics, cements or other organic compounds which can be broken down by ultraviolet radiation or the presence of ionized gases be used in the construction of the chamber, except in areas where such materials are shielded or otherwise made inaccessible to ultraviolet radiation and ionized gases. All parts of the plasma chamber subject to exposure to ultraviolet radiation or ionized gases are constructed of metal or glass, which latter term is used herein to include ceramics and quartz as well as the usual family of amorphous materials.

In the foregoing embodiment, which is particularly advantageous for small lasers where space is at a premium, the pre-ionization current is limited by surrounding the pre-ionizer elements with insulating material. The capacitance element may, however, be formed in other ways. For example, each of the pre-ionizer elements adjacent the electrode 8 may be formed of an exposed conductor which is coupled to the electrode 8a through a conventional capacitor, which may be located within or outside the envelope 4.

In this example, the pre-ionizer elements depend only on the stiffness of the wire loops 16 and 16a for support, but if desired other supporting structures may be employed.

The plasma chamber described is filled with nitrogen gas which has particular advantages for the present application involving a small low-power laser, but the pre-ionizer elements described here may be adapted to lasers using other gases and which may or may not be sealed. Conversely, the sealed nitrogen plasma chamber formed entirely of inorganic materials in areas accessible to ultraviolet radiation or ionized gases may use pre-ionization techniques substantially different from those described here.

The combination of elements and structures set forth herein results in a small, low-power, sealed nitrogen gas laser having a life of many millions of pulses. This relatively low cost plasma chamber represents an economical source of laser pulses readily adaptable for laboratory, field and commercial applications.

I claim:

1. A gas laser system including a laser plasma chamber, said laser plasma chamber comprising
   (a) an envelope containing a lasing gas,
   (b) first and second spaced high voltage electrodes disposed within said envelope and adapted to respond to an externally applied signal to generate an electrical discharge between them in said lasing gas, and
   (c) means, responsive to the externally applied signal, for producing a preionizing discharge in said lasing gas, said preionizing discharge producing means including
   said first electrode,
   a first electrically conductive wire having a pair of end portions electrically coupled to said second electrode and an intermediate portion disposed within said envelope adjacent to and spaced from said first electrode, said intermediate portion extending along a portion of the length of said first electrode, and
   an electrically insulating tube disposed about said intermediate portion of said first wire.

2. The laser system of claim 1 wherein said insulating tube capacitively couples said first wire to said first electrode to limit said preionizing discharge to the displacement current of said capacitance.

3. The laser system of claim 1 wherein said preionizing discharge producing means further comprises
   a second electrically conductive wire having a pair of end regions electrically coupled to said second electrode and an intermediate portion disposed within said envelope adjacent to and spaced from said first electrode, said intermediate portion extending along a portion of the length of said first electrode, and
   an electrically insulating tube disposed about said intermediate portion of said second wire.

4. The laser system of claim 3 wherein said first and second wires are positioned symmetrically with respect to said first electrode.

5. The laser system of claim 1 wherein said first electrode is a cathode and said second electrode is an anode.

6. The laser system of claim 1 wherein said lasing gas comprises nitrogen.

* * * * *